United States Patent [19]
Zarlengo

[11] 4,179,162
[45] Dec. 18, 1979

[54] DYNAMIC WHEEL BALANCING SYSTEM

[76] Inventor: Dominic A. Zarlengo, 3025 W. Scott Pl., Denver, Colo. 80211

[21] Appl. No.: 854,594

[22] Filed: Nov. 25, 1977

[51] Int. Cl.$^2$ .................................................. B60B 13/00
[52] U.S. Cl. .................................................. 301/5 BA
[58] Field of Search ...................... 301/5 B, 5 BA; 152/330 R; 74/573 R, 573 F; 295/6; 241/292; 51/169

[56] References Cited

U.S. PATENT DOCUMENTS

| | | | |
|---|---|---|---|
| 2,242,430 | 5/1941 | Kraft | 301/4 B X |
| 2,695,047 | 11/1954 | Ruck | 301/5 BA |
| 2,909,389 | 10/1959 | Wilborn | 301/5 BA |
| 3,463,551 | 8/1969 | Clay | 301/5 BA |
| 3,464,738 | 9/1969 | Pierce | 301/5 BA |
| 3,913,980 | 10/1975 | Cobb, Jr. | 301/5 BA |
| 4,060,009 | 11/1977 | Wyman | 301/5 BA X |

Primary Examiner—Charles A. Marmor
Attorney, Agent, or Firm—Gary M. Polumbus

[57] ABSTRACT

A system for dynamically and automatically balancing vehicle tires includes a plurality of mobile mass elements loosely positioned within the tire of a wheel-tire assembly so as to be mobile therewithin. Inherent physical characteristics of the mass elements in the form of variations in the shape and composition of the mass elements and/or the interior of the wheel-tire assembly inhibit movement of the mass elements after they have been automatically positioned through rotation of the wheel-tire assembly to balance the wheel-tire assembly.

2 Claims, 10 Drawing Figures

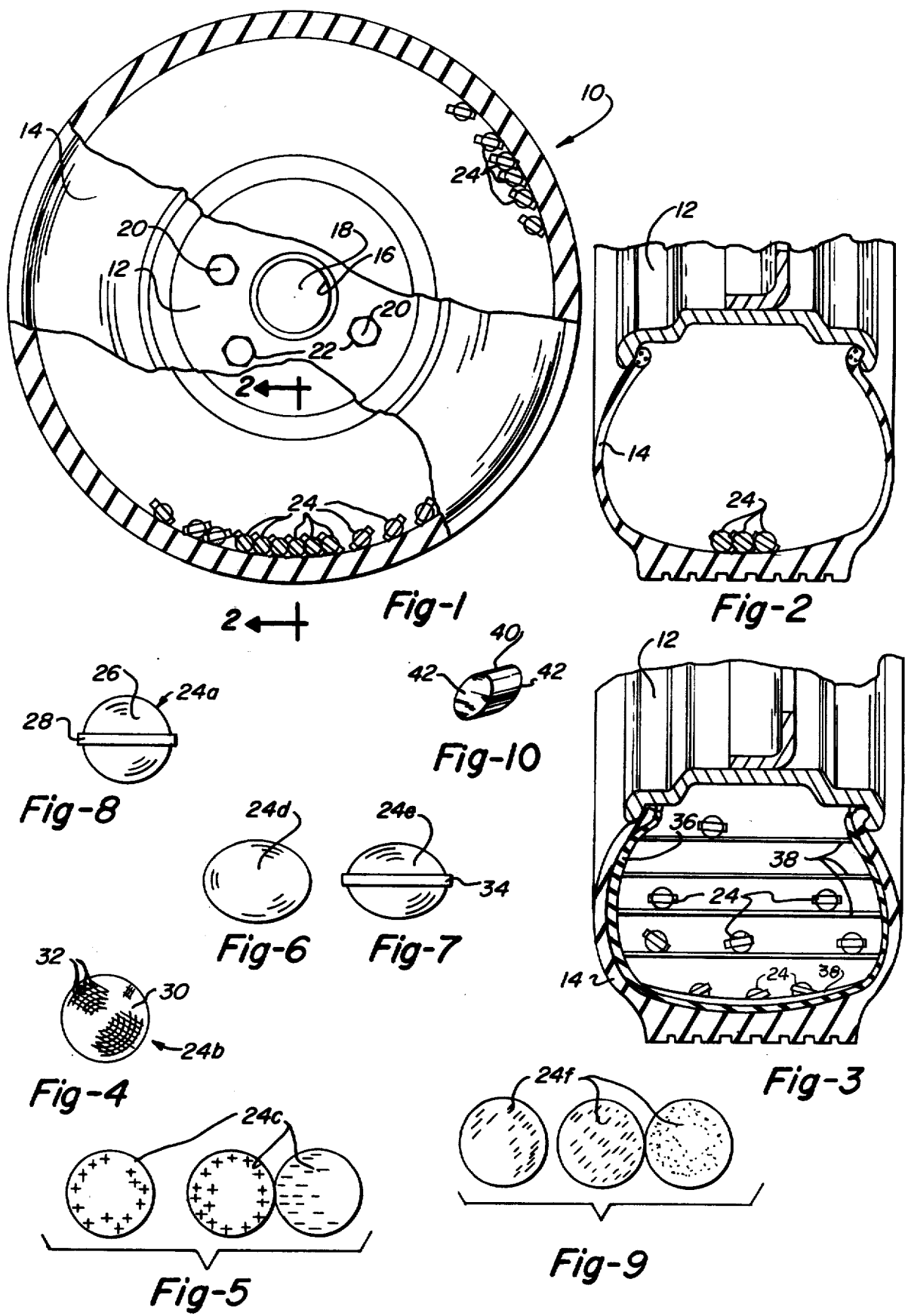

DYNAMIC WHEEL BALANCING SYSTEM

BACKGROUND OF THE INVENTION

The present invention relates generally to systems for balancing wheel-tire assemblies and more specifically relates to a balancing system wherein movable mass elements are positioned loosely within the tire portion of a wheel-tire assembly and means are provided for inhibiting movement of the mass elements after they have been distributed by rotation of the tire into balancing positions.

Numerous means have been provided through the years for properly balancing wheel-tire assemblies so that the tire does not wear unevenly thereby extending the life of the tread on the tire. Probably the most commonly employed system for balancing wheel-tire assemblies is to fixably secure lead weights or the like to the rim of the wheel at a position which is substantially diametrically opposed to the mass of the wheel-tire assembly which tends to cause an imbalance in the assembly. Such systems, however, are not entirely satisfactory since the weights are fixed in position and thereby remain in position when the wheel-tire assembly loses its balanced condition for any one of numerous reasons, such as the wheel becoming out of line or the tires receiving gouges or the like.

Systems have been employed for positioning moveable mass means in a wheel-tire assembly with the mass means, upon rotation of the wheel and tire assembly, seeking a position which is diametrically opposite the mass of the assembly which tends to cause an imbalanced condition. Such systems typically employ a closed but hollow ring fixably secured to the wheel with the moveable mass means being positioned within the ring. Such systems are not entirely satisfactory since the mass means which are confined within the closed ring, while balancing centripedal forces about the axis of rotation, do not compensate for lateral imbalance of the assembly.

Similarly, systems have been developed which do compensate for lateral imbalance by placing mobile mass means loosely within the tire so that the mass means not only distribute themselves circumferentially within the tire to balance centripedal forces, but also distribute themselves laterally of the tire to balance lateral forces. An example of such a system is disclosed in U.S. Pat. No. 2,909,389 issued to J. C. Wilborn on Oct. 20, 1959. In this system, however, the mass means are in the form of spherical balls which readily seek a position within the assembly to balance the assembly, but also readily lose this position when angular speed of assembly decreases or increases.

OBJECTS AND SUMMARY OF THE INVENTION

It is a primary object of the present invention to provide a wheel-tire assembly balancing system which is superior to prior art system as described hereinbefore.

It is another object of the present invention to provide a wheel-tire balancing system wherein mobile mass elements are positioned within the assembly to readily balance the assembly upon rotation thereof as to centripedal forces and lateral forces and wherein the system includes means for retaining the mass elements in their balanced positions for an extended period of time, relative to prior art systems, upon changes of decreased or increased angular speed of the assembly.

It is another object of the present invention to provide a new and improved system for dynamically balancing wheel-tire assemblies which includes a plurality of mass elements positioned within the tire of the assembly and means for inhibiting movement of the elements to encourage the elements to retain their balanced positions in the tire upon changes of decreased or increased angular speed of the assembly.

These and other objects of the invention are attained by either designing the mass elements themselves so that their movement within the tire is impeded or designing an interior surface of the wheel-tire assembly so that it impedes or restricts the movement of the mass means within the assembly.

Retriction on movement of the mass means within the tire can be accomplished by appropriately configuring the mass elements so that they do not move as readily, for example by forming the elements in an ellipsoidal configuration, by electrostatically charging the elements so that they are attracted to one another or to the tire of the assembly, by chemically coating the elements or making the elements from a material which will not move readily across the interior surface of the tire, inner tube or the like, or by providing mechanical deformations on the surface of the mass elements so that they do not roll as readily and possibly releasably interlock with each other.

The inner wall of the wheel-tire assembly against which the mass elements are urged by centrifugal force, which surface could be the inner circumferential wall of a tubeless tire, an inner tube or a liner specifically placed in the tire, could be chemically treated or deformed to restrict movement of the mass elements. Such a deformation could take the form of transverse ripples which would tend to retain the mass elements in balanced conditions.

Other and further objects and advantages of the present invention will become apparent with the following detailed description, drawings and claims, the scope of the invention not being limited to the drawings themselves as the drawings are only for the purpose of illustrating preferred ways in which the principals of the invention can be applied.

Other embodiments of the invention utilizing the same or equivalent principals may be used and structural changes may be made as desired by those skilled in the art without departing from the present invention and the scope of the appended claims.

DESCRIPTION OF THE DRAWINGS

FIG. 1 is a side elevation of a wheel-tire assembly incorporating the present invention with parts broken away for clarity.

FIG. 2 is an enlarged fragmentary section taken along line 2—2 of FIG. 1.

FIG. 3 is an enlarged fragmentary section similar to FIG. 2, illustrating another embodiment of the invention.

FIG. 4 is a elevational view of one embodiment of a mass element for use in the present invention.

FIG. 5 is a diagramatic elevational view of mass elements utilized in another embodiment of the present invention.

FIG. 6 is an elevational view of a mass element utilized in still another embodiment of the present invention.

FIG. 7 is a elevational view of a mass element utilized in still another embodiment of the present invention.

FIG. 8 is an elevational view of a mass element utilized in still another embodiment of the present invention.

FIG. 9 is a diagramatic elevational view of mass elements utilized in still another embodiment of the present invention.

FIG. 10 is an elevational view of a mass element utilized in still another embodiment of the present invention.

DESCRIPTION OF THE PREFERRED EMBODIMENTS

Referring first to FIG. 1, a wheel-tire assembly 10 is shown to include a conventional steel wheel drum 12 upon which a conventional tubeless tire 14 is mounted in sealed relationship therewith. The wheel has a central transverse opening 16 therethrough so that the wheel can be mounted upon the axle 18 of a vehicle and a plurality of openings (not seen) adapted to receive the stud bolts 20 on a conventional vehicle so that the wheel can be secured thereto by lugs 22.

In accordance with the invention, a plurality of mass elements 24 are disposed within the tire. Any number of these mass elements may be suitable for balancing a given wheel-tire assembly but it has been found that fifty to a hundred of such elements will achieve desired results. The mass elements could be made of any suitable material such as steel, ceramic, rubber or the like depending upon desired mobility as will be discussed hereinafter.

The mass elements 24 illustrated in FIG. 1 are of the type shown more clearly in FIG. 8 and referred to therein by reference numeral 24a to comprise a spherical ball 26 of approximately ⅜" in diameter having an annular protruding rib 28 passing therearound. The rib 28 provided on the ball 26 is to inhibit rolling movement of the ball within the tire, but it will not prevent the element from seeking a position within the tire which will place the wheel-tire assembly 10 in balance when the assembly rotates above a predetermined speed. As mentioned previously, the material out of which the element is made will have an effect on the mobility of the element within the tire. For example, if the elements 24 were made of a rubber material, it would roll less rapidly across the rubber interior of the tire than would a smooth steel ball. Accordingly, the material out of which the ball is made would vary depending upon the mobility characteristics desired. As is well known, moveable masses such as the type illustrated will position themselves upon rotation of the wheel-tire assembly substantially diametrically opposite to the mass of the wheel-tire assembly which causes the assembly to be out of balance. The effect of this positioning of the elements within the tire is to move the center of mass of the assembly into coincidence with the center of rotation, i.e. the axle of the vehicle about which the assembly is rotated, and thus eliminate vibration and uneven operation of the assembly.

As will be readily appreciated, since the mass elements 24 are loosely distributed within the tire, they will only seek a position of balance when the tire is rotating above a predetermined speed. At speeds below that speed, the elements will not seek out balanced positions and at slow enough speeds will roll or drop, due to gravity, to the bottom of the tire and will at these slow speeds, not retain the assembly in a balanced condition. Of course, at very low speeds, the balance of the wheel-tire assembly is not critical as there is very little wear on the tire.

Due to the tendency of the masses 24 to loose their balanced positions at slow speeds or under conditions of quick changes in angular speed, it is desirable to design the mass elements or the wheel-tire assembly so that the elements remain in their balanced positions as long as possible when the speed of the assembly changes. To this end, the mass elements 24 have been designed in accordance with the present invention to retain their position as long as possible without inhibiting the ability of the mass elements to seek their balanced positions upon initial rotation of the asembly. In other words, the mass elements 24 of the present invention have been designed so that they will seek positions within the tire 14 which will place the entire wheel-tire assembly 10 in balance upon a predetermined speed of rotation of the assembly but will not readily leave these positions as the rotational speed of the assembly changes.

With the embodiment of the mass element 24a shown in FIGS. 1 and 8, it will be appreciated that the rib 28 provided about the spherical ball 26 will prevent the elements from rolling easily, thus urging them to remain in position for a longer period of time than would, for example, a perfectly spherical element. Further, the ribs of adjacent elements tend to interlock and abut each other so as to inhibit movement of adjacent elements.

FIG. 4 illustrates a second embodiment 24b of a mass element 24 which consists of a spherical ball 30 of any desired material having a diameter of approximately ⅜" which has been deformed by forming circular grooves 32 in the surface thereof. While any number of grooves would have a desired effect upon inhibiting movement of the ball within the tire, the illustration in FIG. 4 shows a great number of such grooves which are intersecting to form a knurled surface on the element. As will be readily appreciated, the knurled surface not only inhibits rolling movement of the element across the interior surface of the tire, but also has interlocking capabilities with adjacent knurled elements the degree of which would depend upon the depth, width and spacing of the grooves 32 in the surface of the element.

FIG. 5 illustrates another embodiment 24c of mass elements 24 which could be utilized in the present invention. The elements 24c illustrated in FIG. 5 are spherical in configuration with a diameter of approximately ⅜" and have been electrostatically charged with opposite charges, approximately half of the elements being of a positive charge and half of a negative charge, so that opposite charged masses would attract each other and when abutted, inhibit each other from rolling as rapidly within the tire as would a single such spherical element.

FIG. 6 illustrates a mass element 24d which is of ellipsoidal longitudinal cross sectional configuration, i.e. assuming an egg-like shape, so that it does not roll as readily as does a spherical element.

FIG. 7 illustrates a similar element 24e of ellipsoidal longitudinal cross section having a peripheral protruding band 34 therearound similar to the rib 28 provided on the element 24a of FIG. 8. Of course, such a band would further inhibit the mobility of the element over that, for example, of a smooth spherical element or even an ellipsoidal element as illustrated in FIG. 6.

FIG. 9 illustrates still a further embodiment 24f of mass elements wherein the elements consist of inner spherical cores of approximately ⅜" diameter which have been coated with materials which partially adhere to each other and/or to the inner wall of the tire so that the elements do not roll as readily as would a smooth spherical element having no such adhesion characteristics. An example of such a coating would be Tarbond TM (a cold tar epoxy) manufactured by Co-Polymer Chemicals 12350 Merriman Road, Libonia, Michigan 48150.

FIG. 10 illustrates still a further embodiment 40 of mass elements wherein the elements consist of a solid, one piece cylindrical body having its opposite ends 42 extending parallel to each other but at an oblique angle to the longitudinal axis of the body. With this configuration, the elements can readily roll along the cylindrical wall to seek a position of balance but upon reaching the position of balance will normally change positions so as to become seated on one of the end walls 42 thereby encouraging the element to remain in position until the speed of the tire has changed appreciably. The element 40 could be made of any suitable material such as a hard rubber or the like.

Movement of the mass elements 24 or 40 within the tire 14 can also be inhibited by deforming the inner surface 14a of the tire so that the deformations therein prevent the mass elements from rolling freely, or by providing a liner 26 within the tire, such as illustrated in FIG. 3, which could have similar deformations. In the illustrated embodiment shown in FIG. 3, the liner 36 is made of a soft rubber and has a plurality of transversely extending ripples 38 which inhibit circumferential movement of the elements 24 within the tire but obviously, the ripples are shallow enough so that they do not prevent the elements from seeking their positions of balance upon initial rotation of the wheel-tire assembly. The depth of such ripples would preferably be in the range of 0.02 to 1.125 inches for elements having a radius of at least one-eighth inch.

I claim as my invention:

1. In a system for balancing a wheel-tire assembly wherein the assembly includes a wheel upon which a tire is mounted, the improvement comprising a plurality of separate independently movable mass means positioned within said tire, said mass means having a generally cylindrical configuration defining a cylindrical wall, with the ends of the cylinder lying in planes which are oblique to the longitudinal axis of the cylinder such that the mass means can roll along their cylindrical wall until a balanced condition of the assembly is attained and will then seat on one of said ends to inhibit further movement of the mass means upon a change in rotational speed of the assembly.

2. In the system of claim 1, said cylinders being of solid, one piece construction.

* * * * *